United States Patent [19]

Pauwels et al.

[11] Patent Number: 5,404,352
[45] Date of Patent: Apr. 4, 1995

[54] PACKET TRANSFER CONTROL ARRANGEMENT AND RELATED METHOD

[75] Inventors: Bart J. G. Pauwels, Borgerhout; Henri A. J. Verhille, Brecht, both of Belgium

[73] Assignee: Alcatel N.V., Amsterdam, Netherlands

[21] Appl. No.: 961,580

[22] Filed: Oct. 14, 1992

[30] Foreign Application Priority Data

Oct. 16, 1991 [EP] European Pat. Off. ............ 91202660

[51] Int. Cl.⁶ .......................................... H04L 12/56
[52] U.S. Cl. .................................... 370/60; 370/94.1
[58] Field of Search ...................... 370/94.1, 60, 60.1, 370/58.1, 58.2, 13, 17, 16, 14; 340/825.52, 825.8, 826, 825.03

[56] References Cited

U.S. PATENT DOCUMENTS

| | | | |
|---|---|---|---|
| 4,081,611 | 3/1978 | Bovo et al. | 370/63 |
| 4,491,943 | 1/1985 | Iga et al. | 370/13 |
| 4,536,870 | 8/1985 | Bovo et al. | 370/16 |
| 4,884,264 | 11/1989 | Servel et al. | 370/94.1 |
| 4,890,280 | 12/1989 | Hirata | 370/94.1 |
| 4,922,487 | 5/1990 | Eilenberger et al. | 370/60 |
| 5,050,166 | 9/1991 | Cantoni et al. | 370/61 |
| 5,128,929 | 7/1992 | Kobayashi | 370/94.1 |
| 5,130,979 | 7/1992 | Ohtawa | 370/58.1 |
| 5,202,885 | 4/1993 | Schrodi et al. | 370/60 |
| 5,272,696 | 12/1993 | Munter et al. | 370/60 |

FOREIGN PATENT DOCUMENTS

| | | |
|---|---|---|
| 0384936 | 9/1990 | European Pat. Off. . |
| 0446492 | 9/1991 | European Pat. Off. . |
| 2165124 | 4/1986 | United Kingdom . |
| 9102420 | 2/1991 | WIPO . |

OTHER PUBLICATIONS

D. G. Fisher et al, "A Flexible Network Architecture for the Introduction of ATM", *XIIIth International Switching Symposium* (Stockholm), vol. II, Paper #6, 1990, pp. 35–44.

Primary Examiner—Douglas W. Olms
Assistant Examiner—Chau T. Nguyen
Attorney, Agent, or Firm—Robbins, Berliner & Carson

[57] ABSTRACT

The packet transfer control arrangement ensures that an information packet transferred from an input to an output of a packet switching network is available in correct form at that output. It includes copying means (SE11-/SEmn) located at the input of the network to make copies of the packet to be transferred, routing means (HA11/HAmn; SE11/SEmn) to transfer these copies independently from each other and possibly over at least partly distinct paths from an input to an output of the network and filtering modules (F11/Fmn) to filter out one of the copies at the output of the network.

7 Claims, 4 Drawing Sheets

PACKET TRANSFER CONTROL ARRANGEMENT AND RELATED METHOD

TECHNICAL FIELD

The present invention relates to a packet transfer control arrangement to ensure that an information packet transferred from an input to an output of a packet switching network is available in correct form at said output.

BACKGROUND ART

Such an arrangement is already known in the art, e.g. from the article "A flexible network architecture for the introduction of ATM" by D. G. Fisher et al., Proceedings of the XIIIth International Switching Symposium, 1990, Stockholm, Volume II, pp. 35-44. In this known arrangement the switching network includes duplicated network modules celled planes and for each packet to be transferred it establishes more than one path over the planes and between two ports of the network. In this way a relatively high probability for a transferred packet to reach the output port is ensured.

Such a duplication of the network elements of course results in a corresponding increase of the network coats.

DISCLOSURE OF INVENTION

An object of the invention is to provide an arrangement of the above type but requiring less redundancy in the switching network.

This object is achieved due to the fact that said arrangement includes:
- copying means at said input to make at least one copy of said information packet in order to obtain at least two specimens thereof,
- means to transfer said specimens independently from each other over said packet switching network to said output; and
- a filtering module at said output to filter out one of said specimens and apply it to said output.

The probability for two or more specimens of a packet to get lost or corrupted is substantially lower than it is for one specimen.

Thus receipt of packets in a correct form is ensured without the need for increasing redundancy.

An additional feature of the invention is that said arrangement also includes routing means which are associated with to said copying means and include in said specimens routing information to route said specimens through said switching network over at least partly separate paths.

In this way the possibility of packet loss or corruption is even more reduced.

The invention also relates to a method for ensuring that an information packet transferred from an input to an output of a packet switching network is available in correct form at said output.

Such a method is also described in the above mentioned article and has the same drawback as the related known packet transfer control arrangement. It indeed needs duplicated network elements giving rise to an increased network cost.

An additional object of the invention is to provide a method of the above type but without the drawback mentioned.

This object is achieved due to the fact that said method includes, for each packet to be transferred, the steps of:
- making at least one copy of said packet in order to obtain at least two specimens thereof;
- transferring said specimens over said network to said output; and
- filtering at said output one acceptable specimen out of said specimens.

By copying the packets and transferring the thus obtained specimens of the packet to the same mentioned output the possibility of loss and/or corruption of packets is reduced as explained above without a need for increasing the number of network elements.

An additional feature of the above method is that said specimens are transferred over said network in such a way that they follow paths which are at least partly distinct.

BRIEF DESCRIPTION OF DRAWING

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
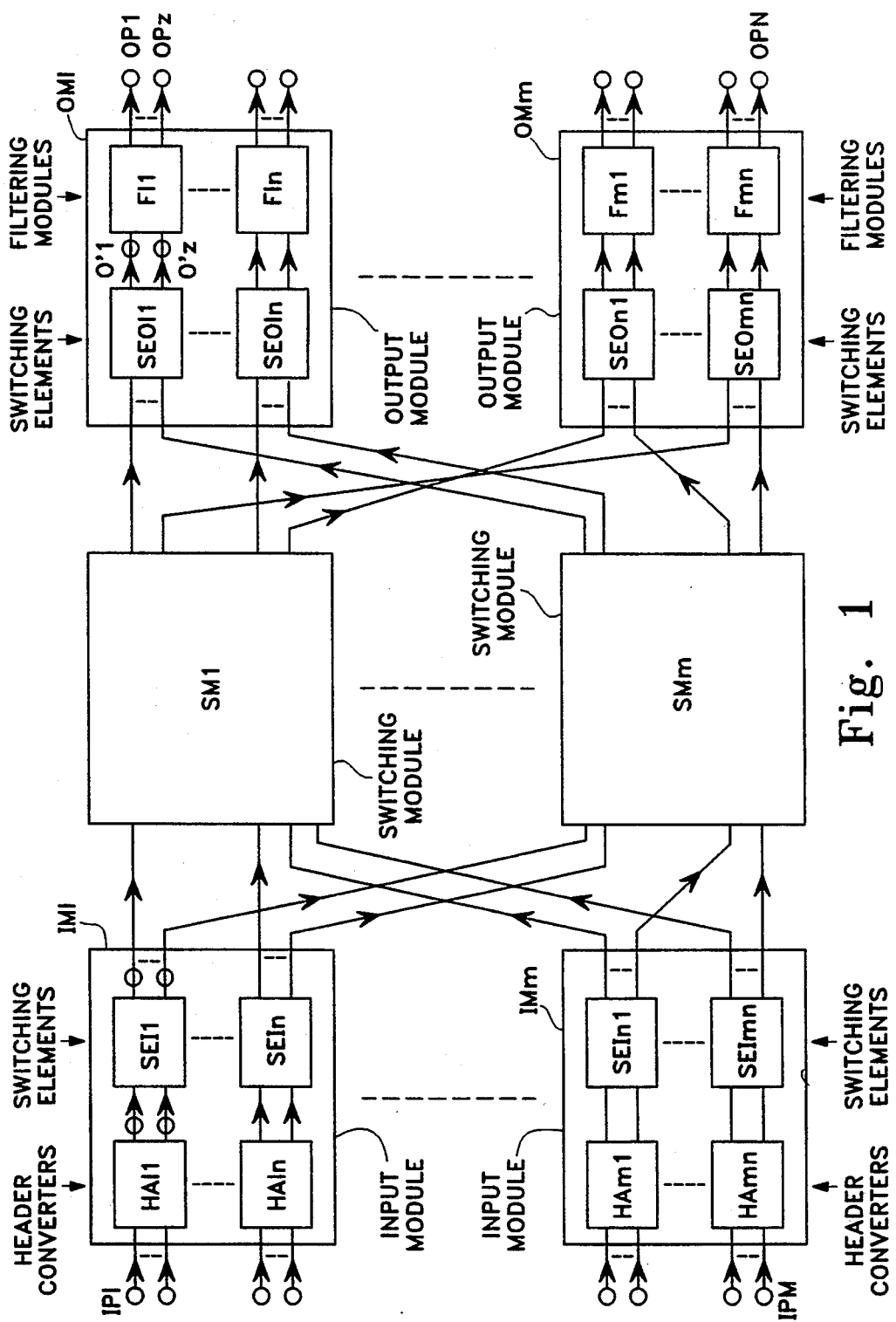
FIG. 1 is a block diagram of a packet switching network with and associated packet transfer control arrangement according to the invention.

The packet switching network represented in FIG. 1 is a multiple path, self routing network of the type disclosed in the not yet published European patent application 90200593.3, (corresponding to commonly assigned copending U.S. application Ser. No. 07/668,937, which is hereby incorporated by reference) and has a packet transfer control arrangement associated to it. It is used to transfer packets of information from any of its M input ports IP1 to IPM to one or more of its N output ports OP1 to OPN.

The network is built-up by means of m input modules IM1 to IMm, m switching modules SM1 to SMm and m output modules OM1 to OMm, all interconnected as shown by bundles of external links.

The input modules IM1 to IMm each include a number of header conversion modules and a number of switching elements. For example, IM1 includes a n header conversion modules HA11 to HA1n which are connected to respective ones of n switching elements SEI11 to SEI1n via sets of links. For instance, HA11 is coupled to the x inputs I1 to Ix of SEI11 by means of the set of x links I1 to Ix and SEI11 has y output terminals O1 to Oy connected to like named external links.

The values M, N, m, n, x, y, are determined by the size of the network. Typical values are x=8, y=8, n=16, m=16 which results in M=N=2048.

The switching modules SM1 to SMm are constituted of a plurality of interconnected switching elements (not shown) identical to SEI11. Two variants of such switching modules are disclosed in the above mentioned European patent application and these modules are therefore not described in detail.

The output modules OM1 to OMm each include a number of switching elements and a number of filtering modules. For example, OM1 includes n switching elements SEO11 to SEO1n which are connected to respective ones of n filtering modules F11 to F1n via sets of links. For instance, SEO11 is coupled to z inputs 0'1 to 0'z of F11 by means of the set of z links 0'1 to 0'z and F11 has z output terminals OP1 to OPz connected to like named external links. A typical value of z is 8.

Each of the information packets arriving at the input ports of the network comprises a header and an information part generally called payload part, the header including routing information and information concerning the requiring number of copies to be made.

Each of the header conversion modules, such as HA11, is able to analyse the header of a packet supplied to one of its inputs and to convert, by using a translation table (not shown), the information contained in the header of the packet to a predetermined code known by the switching elements included in the network and indicating to each of these switching elements the number of copies to be made and the address of the switching element output port to which each of the thus obtained specimens of the packet has to be transferred.

Each header conversion module additionally inserts in the header of the packet a packet identifier, more specifically a time stamp TSTP, and a connection identifier CI identifying the communication to which the packet belongs. The design of an header conversion module by a person skilled in the art is obvious from its functional description and is therefore not described in detail.

The switching elements of the network are all identical and are of a type such as disclosed in the published International patent application PCT/EP89/00942 (corresponding to commonly assigned U.S. application Ser. No. 07/565,310, now U.S. Pat. No. 5,214,639, which is hereby incorporated by reference). One of them, namely SEI11, is represented in detail in FIG. 2. It has inputs I1 to Ix connected to respective data inputs of a multiplexer circuit MX through the cascade connection of a respective series-to-parallel converter circuit SP1/SPx and a respective latch circuit IL1/ILx. The selection input XI of the multiplexer MX is controlled by an input clock circuit XC and its data output is coupled to the data input CI of a RAM buffer memory BM.

The buffer memory BM further has a data output which is coupled to the data input of a demultiplexer DX whose selection input YI is controlled by an output clock circuit YC and whose data outputs are coupled to respective ones of the outputs O1/Oy via respective ones of parallel-to-series converter circuits PS1/PSy. The output clock circuit YC is such that the demultiplexer DX is able to successively connect its data input to its data outputs.

The buffer memory BM comprises a number of buffers or memory locations which are each able to store a single packet, and has an address input AC as well as a read/write selection input RW, these inputs being respectively coupled to like named outputs of a buffer memory management unit BMMU.

The switching element SEI11 further includes a routing logic RL whose input is coupled to the data output CI of the multiplexer MX. The routing logic RL is able to interpret information contained in the header of a packet and to then supply to the buffer memory management unit BMMU a control signal C which is function of this information. More particularly, the latter control signal C contains a set of addresses, of one or more of the outputs O1/Oy, to each of which a specimen of the packet has to be transferred. This means that the number of addresses is equal to the number of these specimens.

The buffer memory management unit BMMU is coupled to the above mentioned selection inputs XI and YI of MX and DX respectively, and under control of the control signal C it manages the use of the buffers of the memory BM.

A more complete description of the switching element SEI11 may be found in the mentioned International patent application.

Figure 3:
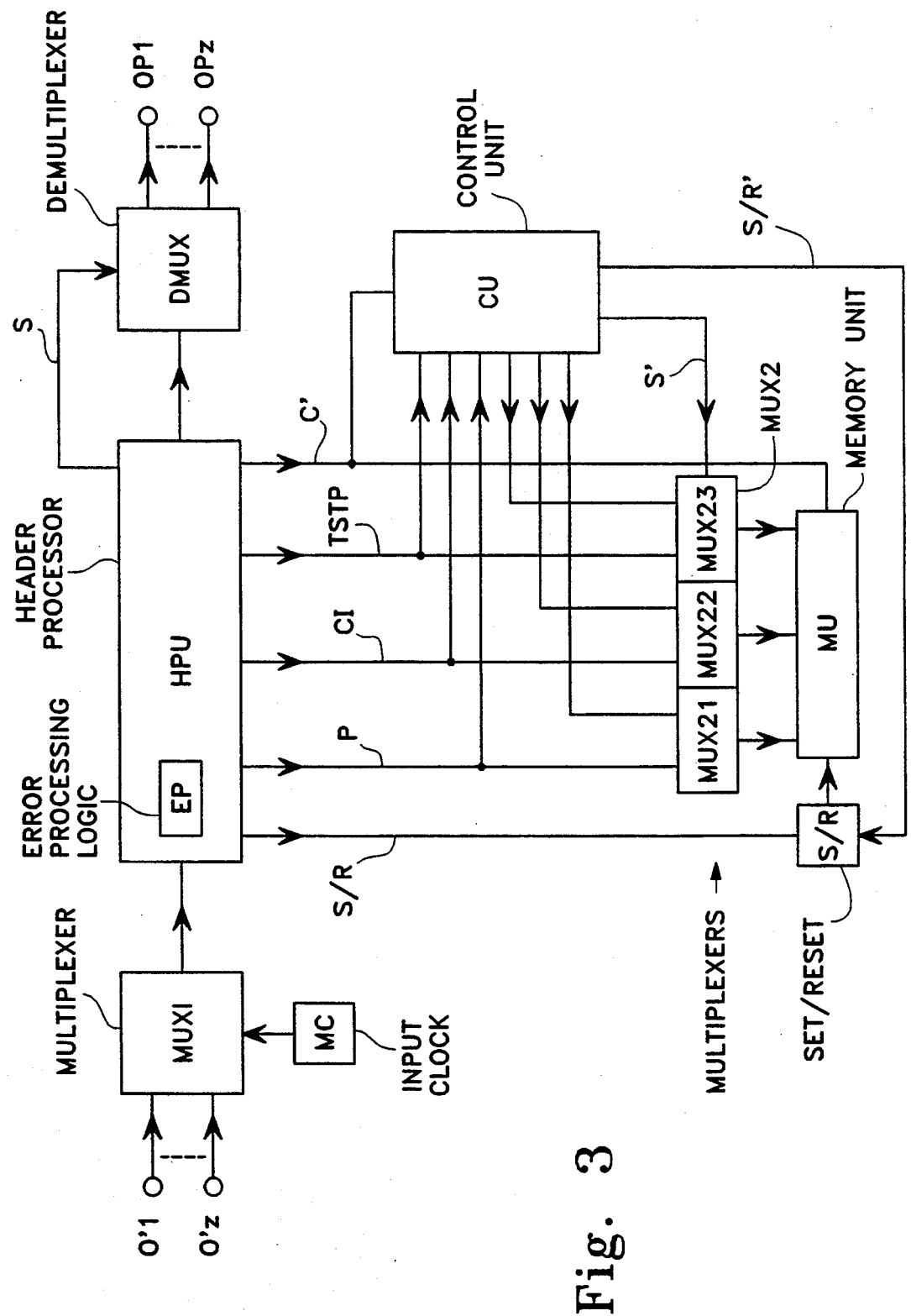
FIG. 3 shows the filtering circuit F11 of FIG. 1 in more detail.

The above mentioned filtering modules F12 to Fmn shown in FIG. 1 are all identical to the module F11 represented in FIG. 3. The latter module includes a multiplexer circuit MUX1 with input terminals 0−1 to 0'z and with a selection input controlled by an input clock circuit MC under the control of which the multiplexer is able to successively connect its inputs to its data output. The latter is coupled to a data input of a header processing unit HPU which also has a control input C' to which a like named signal C' is applied from a memory unit MU.

This header processing unit HPU further has a data output connected to the input of a demultiplexer DMUX and three control outputs P, CI, TSTP on which like named signals are provided and which are connected to corresponding inputs of a second multiplexer circuit MUX2 and a control unit CU. HPU finally has a fourth control output S/R and a fifth control output S coupled to a set/reset circuit S/R and to the selection input S of the demultiplexer DMUX respectively.

MUX2 more precisely comprises three 2-to-1 multiplexers (MUX21, MUX22, MUX23]) with a common selection input S'. The control outputs P, CI, TSTP of HPU are connected to a first input of respective ones of these 2-to-1 multiplexers. MUX2 has three outputs constituted by the outputs of the three 2-to-1 multiplexers and connected to an address input of the memory unit MU. The latter unit is controlled by the set/reset circuit S/R and is subdivided in a plurality of not shown storage units called pages.

The control unit CU has a control input to which the signal C' is applied and 3 data outputs each coupled to a second input of respective ones of the 2-to-1 multiplexers of the multiplexer MUX2, a first control output S' connected to the selection input S' of the multiplexer MUX2, and a second control output S/R' coupled to the set/reset circuit S/R.

The outputs OP1 to OPz of the demultiplexer DMUX constitute the outputs OP1 to OPz of the filtering module F11.

Figure 2:
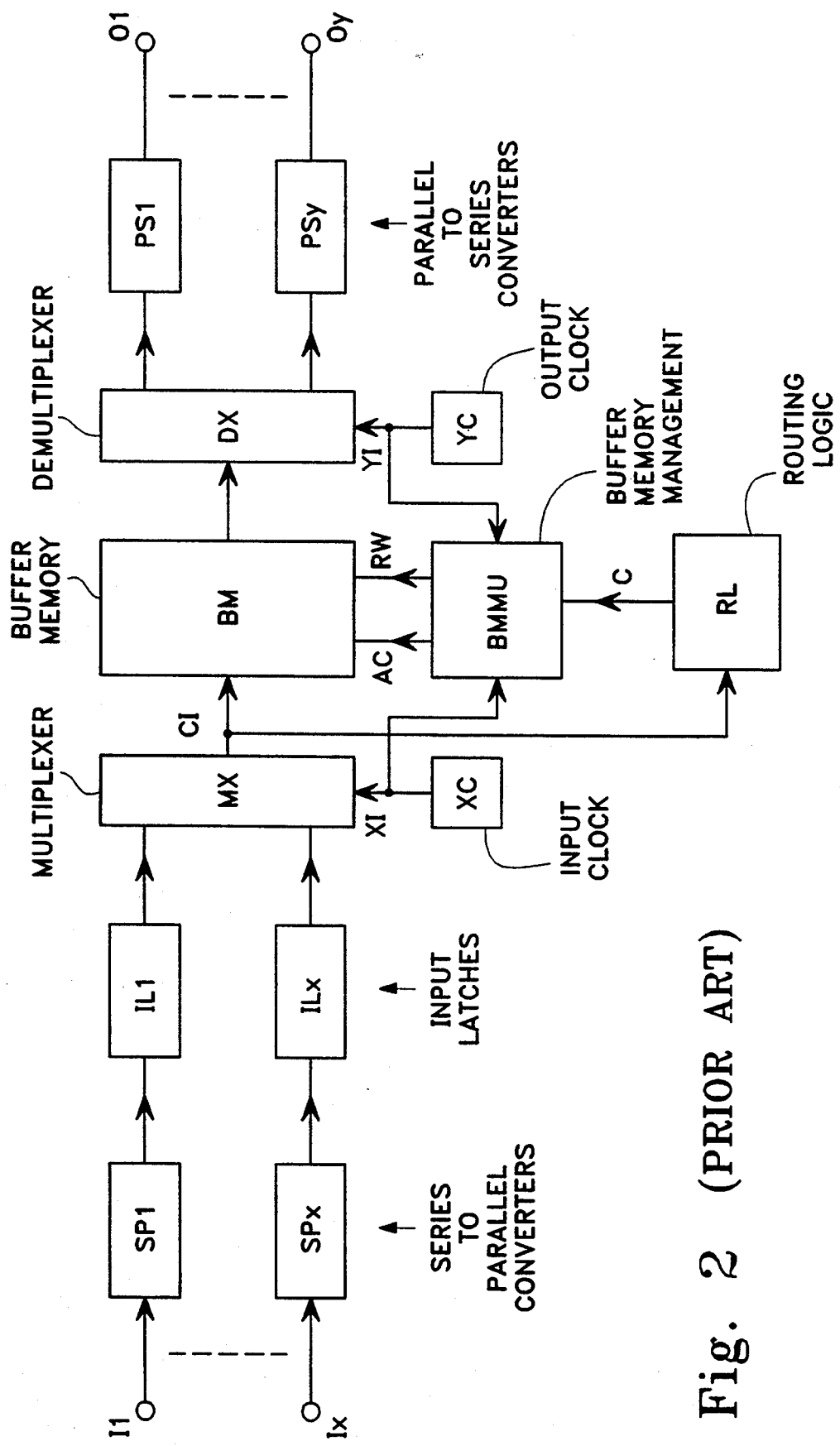
FIG. 2 represents in more detail the switching element SEI11 of FIG. 1.

Reference is now made to FIGS. 1 to 3 for a description of the routing of a packet through the switching network and of the operation of the packet transfer control arrangement associated therewith.

An information packet arriving at one of the input ports of the switching network, e.g. IP1 of FIG. 1, is analyzed by the associated header conversion module HA11. As mentioned earlier, this module HA11 converts the information contained in the header of the packet into a code to be interpreted by the switching elements of the network through which the packet has to be routed.

The packet with converted header is for instance transferred to input terminal I1 of the switching element SE11 represented in FIG. 2. This packet is converted in the corresponding series-to-parallel convertor circuit SP1 of SE11 and from this convertor circuit SP1 the thus obtained parallel version of the packet is transferred to the corresponding latch circuit IL1. From there it is supplied to the multiplexer MX from which it is transferred, under control of the clock signal XI provided by XC at the selection input of MX, to the data input CI of the buffer memory BM and of the routing logic RL. By means of a local routing table the earlier mentioned code provided by the header assignment module HA11, is converted to a set of one or more addresses of the output O1/Oy to each of which a specimen of the packet has to be sent, i.e. the number of output addresses corresponds to the number of specimens of the packet as mentioned earlier. This set of addresses is passed to the unit BMMU by means of the control signal C.

It has to be noted that the local routing table can be, and mostly is, different for the different switching elements of the network. The latter table is established based on the structure of the packet switching network and on the reliability of the switching elements of that network.

Under control of the above activated signal XI provided by XC the unit BMMU provides the address of a free buffer at the address input AC of the memory BM and applies an activated signal to the input RW thereof. As a consequence the packet at the data input CI of the buffer memory BM is written in that free buffer and the address thereof is made busy by the unit BMMU by adding it to a list of busy buffers. This list also contains for each buffer address the above set of output port addresses to which the buffered packet has to be sent.

During a read-out operation the clock signal YI provided by the clock circuit YC indicates to the unit BMMU to which one of its outputs and consequently to which output address the demultiplexer DX has to convey a packet applied to its input. BMMU then searches in its list of busy buffers for a buffer whose contents have to be sent to the latter address and supplies the address of this buffer to the address input AC of the buffer memory BM. It also applies a deactivated signal to the input R/W. As a consequence the packet contained in the corresponding buffer is read-out and transferred to the data output of the buffer memory BM. From there the packet is supplied by the demultiplexer DX to the output thereof which is indicated by the selection signal YC. Afterwards it is applied to the input of the corresponding parallel-to-series conversion circuit PS1/y by which it is provided at the corresponding output O1/Oy.

The output port address to which the packet specimen was routed is then deleted by the unit BMMU from the above mentioned set of output port addresses linked to the considered buffer address of the busy buffer list. The buffer address itself remains in the latter list as long as there are output port addresses linked to it.

From the above it follows that in each section element of the network, means, more specifically BMMU and BM, are provided to make copies of a packet which has to be transferred and that the header conversion modules HA11 to HAmn constitute routing means which insert routing information in the headers of the thus obtained specimens of the packet to route them through the network via separate or distinct paths.

In this way a relatively safe transfer of the packet over the network is ensured since the probability of simultaneous loss or corruption of two or more packets is obviously much lower than the probability of loss or corruption of a single one.

It has to be noted that the paths followed by the specimens of a packet do not necessarily have to be completely separate or distinct. For instance, if the probability of packet loss is relatively high on a well known critical part of a path, whereas it is low on the rest of the path, it is sufficient for the specimens of this packet to follow a different route only for the critical path part. The specimens can even be sent over the network without indication in their header of a predetermined path, thereby relying on the fact that the probability that two specimens will follow the same path is relatively low. In that case the header of the packet only contains an indication of the number of copies to be made and of the destination address of the thus obtained specimens.

It has also to be noted that the above mentioned probability decreases with the number of specimens until a minimum is reached. Beyond this minimum there is an increase of the possibility for loss of packets due to overload caused by the relatively high number of specimens. To avoid this overload, a restricted redundancy of network modules might be necessary. However, this redundancy can be dimensioned according to the expected ratio of high quality connections, i.e. based on multiple connections, versus low quality connections i.e. based on single connections.

A more detailed description of the working of the switching elements of the network may be found in the earlier mentioned international patent application PCT/EP89/000942.

When the specimens of a packet have been routed through the network, in the way described above, they consecutively appear at an input of a filtering module, e.g. input 0'1 of F11, which is determined by the routing information specified in the header of the original packet.

Filtering of these specimens, i.e. the extraction of a single one thereof, is explained hereafter by making reference to FIG. 3.

By the multiplexer MUX1 and under the control of the clock circuit MC all specimens are consecutively applied to the header processing unit HPU. The latter unit analyses the header information of each specimen received and extracts from it the earlier mentioned time stamp TSTP and the connection identifier CI and provides them together with a page number P at its respective control outputs TSTP, CI and P. How this page number is determined will be explained later. The page number P, the time stamp TSTP and the connection identifier CI are applied to the address inputs of the digital memory unit MU via MUX2. Together they constitute a memory address. How the selection input of MUX2 is controlled will also be explained later.

The header processing unit HPU generates the earlier mentioned fourth signal S/R and applies it to the set/reset circuit S/R to indicate to the memory unit MU that on a page number P supplied on its input P and at a sub-address thereof, derived from the identifier CI and the time stamp TSTP, supplied at its inputs CI and TSTP respectively a value 1 has to be written in MU. If the current value stored at that location is 0, indicating that no specimen of the packet with identifier CI and time stamp TSTP has been received yet and that the received specimen is the first one of a set of specimens of the latter packet, then a deactivated signal C' is generated by the memory unit MU. If the latter value is already 1, this means that a specimen with a header including a same packet identifier TSTP and a same connection identifier CI, i.e. a copy of the same packet, has already been stored and that the specimen just received is not the first one and must therefore be discarded. This fact is indicated by an activated signal C' generated by the memory unit MU. The signal C' is applied to the input C' of the header processing HPU which passes the specimen to the demultiplexer DMUX or discards it depending on the signal C' being deactivated or activated respectively. The header processing unit HPU constitutes selection means which for each packet specimen, received at its input, checks whether this is the first one and selects it for further processing if this is the case. If not, the specimen is discarded.

HPU controls the selection input of CMUX so that the latter passes the packet specimen applied to its input to the one of the output ports OP1/z having the address contained in the header of the specimen.

In this way a first specimen of a packet is filtered out of a plurality of specimens thereof by the filtering unit F11.

The control unit CU controls the clearing of the memory pages of MU. The instants and sequence of clearing these pages, as well as the value of the page number P generated by the header processing unit HPU, are determined by the transfer rate of the packets, more specifically the minimum and maximum transfer time of a packet through the network, by the time needed to clear a page and by the wrap-around value of the time stamp TSTP. The latter value is the maximum TSTP value after which an initial TSTP value is reused. The current TSTP value is obtained by incrementing a previous TSTP value with a predetermined value, starting from the mentioned initial value. How the above parameters are defined will be explained later.

The above time stamp TSTP, connection identifier CI and page P values are also passed to the control unit CU. At the instant of clearing an element of page P the control unit CU applies these values to the respective inputs of the 2-to-1 multiplexers of MUX2 and controls the selection input S' thereof so that these values are applied at the inputs of the memory unit MU. At the same time the control unit CU forces the set/reset circuit S/R to apply an activated reset signal to the control input of the memory unit MU. As a consequence the memory unit MU resets the value at the memory address constituted by the page number P and the subaddress derived from the connection identifier CI and time stamp TSTP provided at its inputs to 0.

In this way a memory location of MU is reset as soon as packet specimens to be registered at that location are no longer expected.

After this reset operation the control unit CU deactivates the reset signal applied to MU via the circuit S/R and changes the value of the signal S' applied to the selection input of the multiplexer MUX2. As a consequence MUX2 passes to its outputs the signals applied to its inputs by the header processing unit HPU.

The control unit CU in this way constitutes clearing means of the filtering unit.

In the following it is described how to determine the number of pages contained in the memory unit MU, how the header processing unit HPU determines the value of the page number to be passed to the multiplexer MUX2 and to the control unit CU and how the instants and sequence of clearing these pages are determined by the control unit CU.

Figure 4:
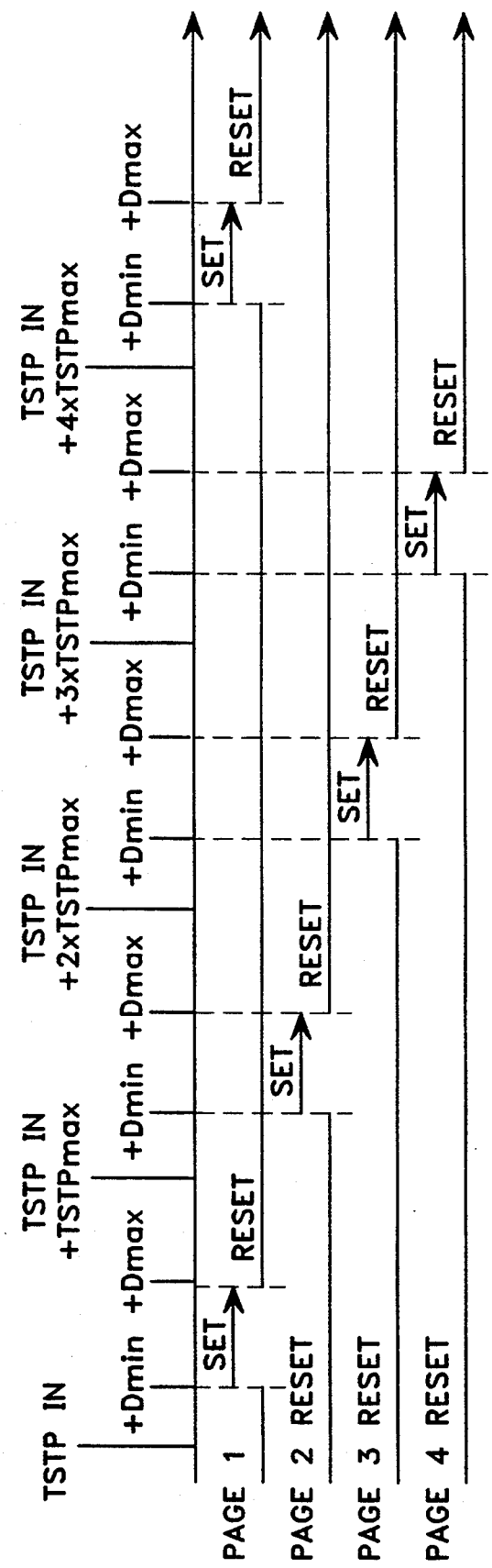
FIG. 4 is a time diagram related to the control of the memory unit MU of FIG. 3.

For this purpose reference is made to the time sequence diagram of FIG. 4, where following symbols are used:

TSTPIN is the instant at which an initial time stamp TSTPIN is assigned to a packet applied to one of the input ports of the switching network;

Dmin the minimum time needed to transfer a packet from an input to an output of the network. This transfer time is from now on called transfer delay;

Dmax the maximum transfer delay of a packet through the network;

TSTPmax is the time interval starting at the assignment of an initial time stamp value, after which the maximum time stamp value is assigned, i.e. at TSTPIN+XxTSTPmax, a wrap-around occurs; where X is an integer value, SET is the time interval during which a first specimen of a packet can be received; which corresponds to the time interval during which a location of the memory unit MU (FIG. 3) is available for registering a corresponding first specimen of a packet.

RESET is the time interval available to clear a location of the memory unit MU (FIG. 3) where a received first specimen of a packet has been registered.

First the number of pages contained in the memory unit MU is determined.

Supposing this number is equal to n, then the time interval RESET available to clear a memory location is equal to n times TSTPmax—(Dmax-Dmin). Indeed, a first specimen of a packet applied to an input port at the instant TSTPIN can be received by the corresponding filtering module up to the instant TSTPIN+Dmax to be stored in MU at a memory location of for instance page PAGE 1. A subsequent first specimen with a time stamp value different from TSTP in is registered on the same page PAGE 1 of MU. When, due to wrap around of the time stamp at the time TSTPIN+TSTPmax again a specimen with time stamp TSTPIN is received, i.e. in the interval TSTPIN+TSTPmax+CMIN TSTPIN+TSTPmax+Dmax, this specimen must be registered on a new page, e.g. page PAGE 2. New pages are in this way used until the n th page whereafter page PAGE 1 has to be reused. In other words the location on page PAGE 1 where the first mentioned specimen with time stamp TSTPIN was registered, has to be cleared within the time interval TSTPIN+NTSTPMA+DMIN, TSTPIN+nxTSTPmax as shown in FIG. 4, since from the instant TSTPIN+NTSTAMAX on a specimen of another packet also with time stamp TSTPIN to be registered on page PAGE 1 can be received. The time interval RESET is consequently equal to (TSTPIN+nxTSTPmax+Dmin)−(TSTPIN+Dmax) i.e. nxTSTPmax−(Dmax+Dmin).

As a consequence the number of pages is equal to $$\frac{RESET + (Dmax - Dmin)}{TSTPmax}$$

or the integer value thereof plus 1 if the result of the division is fractional. For the considered embodiment this calculation results in 4 pages as shown in FIG. 4, where PAGE 1 to PAGE 4 represent the page with number 1 to 4 respectively.

In the following it is described how the header processing unit HPU determines the value of the page to be used by the memory unit MU for registration of a first specimen, i.e. the value of P applied to the address input P of MU.

A first specimen of a packet with time stamp TSTPIN has to be registered on PAGE 1 in the interval TSTPIN+Dmin, TSTPIN+Dmax. A subsequent specimen of a packet with the same time stamp assigned to it after wrap-around has to be registered on PAGE 2 as explained above. This latter packet arrives in the filtering unit during the interval TSTPIN+TSTPmax+Dmin, TSTPIN+TSTPmax+Dmax. During this latter interval however specimens of packets applied to an input port before the wrap-around which have to be registered on page PAGE 1 can still be received by the filtering unit F11. This means that during this interval the signal produced at the output P of the header processing unit HPU (FIG. 3) has either the value PAGE 1 or PAGE 2 depending on the value of the time stamp included in the header of a received specimen, i.e. a value before or after wrap-around respectively.

To determine the value of the page provided at the output P, the header processing unit HPU uses a 10 bit counter (not shown) which is synchronous with an 8 bit counter (also not shown) used at the input ports of the network, the latter counter being used to generate the time stamp values inserted in the header of the information packets. This time stamp value wraps around at 256. The 2 most significant bits of the 10 bits outputs of the 10 bits clock indicate the page number of the page to be used: If the time stamp value of the received specimen is smaller than the value of the 8 least significant bits of the 10 bit clock, then the value of the page to be used is equal to the value of the mentioned 2 most significant bits plus 1, otherwise the page value is equal to the value indicated by the latter 2 bits.

Suppose for example that after a first wrap around the 10 bit clock indicates the value 0100000010 and a specimen with time stamp 100000001 is received. This time stamp was assigned after wrap around and the corresponding specimen has to be registered on page PAGE 2, whilst a specimen with for instance time stamp 1111110 assigned before wrap around has to be registered on page PAGE 1.

An explanation is now given of how the instant of clearing the above pages by the control unit CU is determined, the sequence thereof being indicated by the signal P applied to the corresponding input of CU.

As shown in FIG. 4 and explained earlier, a first specimen of a packet with time stamp TSTPIN can be received by a filtering module from the instant TSTPIN+Dmin on, whilst the memory location where that specimen is registered may be cleared or reset from TSTPIN+Dmax on. This means that the control unit CU of FIG. 3 has to wait for at least an interval Dmax−Dmin after receipt of the above mentioned first specimen by the header processing unit HPU before passing the signals P, CI and TSTP applied to its inputs by the latter to the memory unit MU and controlling the set/reset circuit S/R to reset the corresponding memory location. The signal C' applied to the control input of the control unit CU indicates as explained earlier whether the received specimen is a first one or not.

It has to be noted that an information packet can be identified by a sequence number, unique for each connection, instead of by a time stamp, unique for each input port. In that case a similar reasoning as above is applicable.

Based on the functional description of the header processing unit HPU, the control unit CU and the memory unit MU, their realization is obvious for a person skilled in the art and is therefore not described in detail.

It has to be noted that the above described filtering module filters out the first one of a series of specimens. Inserting an error check word in the header of the packet before copying it and adding an additional error processing logic in the header processing unit HPU would make it possible to detect errors in transferred specimens and to filter out not the first received specimen, but the first received specimen without errors.

While the principles of the invention have been described above in connection with specific apparatus, it is to be clearly understood that this description is made only by way of example and not as a limitation on the scope of the invention.

We claim:

1. Packet transfer control arrangement to ensure that an information packet transferred from an input to an output of a packet switching network is available in correct form at said output, said arrangement comprising:

copying means at said input for making at least one complete copy of said information packet in order to obtain at least two complete specimens thereof, each of said complete specimens comprising either a complete original said information packet or a complete copy of said information packet;

transfer means for transferring said at least two complete specimens independently from each other over said packet switching network towards said output, each independently transferred complete specimen being subject to possible loss or corruption as it is being transferred over said packet switching network; and filtering means at said output for receiving the complete specimens transferred by the transfer means and for filtering out a received one of said complete specimens and applying said received one complete specimen to said output and for discarding any received other complete specimens of the same said information packet, said filtering means further comprising:

a plurality of memory locations, selection means for determining if each complete specimen received at said output has been corrupted and for registering the receipt of a first non-corrupted one of said at least two complete specimens at a selected one of said memory locations and for discarding any other corrupted or non-corrupted said complete specimens of the same said information packet that have also been received at said output, and clearing means for clearing said selected location after a predetermined time interval starting at the receipt of a first one of said at least two complete specimens, thereby making said selected location again available.

2. Packet transfer control arrangement according to claim 1, further comprising routing means associated with said copying means for including different routing information in each of said complete specimens which is used by said transfer means to route said complete specimens through said switching network over at least partly separate paths.

3. Packet transfer control arrangement according to claim 2, wherein said packet switching network includes switching nodes, and said routing means determines said routing information based on routing tables included in said switching notes.

4. Packet transfer control arrangement according to claim 1, wherein each of said at least two complete specimens includes a packet identifier and a connection identifier indicative of the communication to which said packet belongs, said packet identifier together with said connection identifier determining said selected location.

5. Packet transfer control arrangement according to claim 4, wherein the value of said packet identifier wraps around at a predetermined maximum value, and the instant of said wrap around determines said selected memory module.

6. Method for ensuring that an information packet transferred from an input to an output of a packet switching network is available in correct form at said output, said method comprising, for each packet to be protected, the steps of:

making at least one complete copy of said packet in order to obtain at least two complete specimens thereof, each of said complete specimens comprising either a complete original said information packet or a complete copy of said information packet;

transferring said complete specimens over said network to said output; determining if each complete specimen received at said output has been corrupted;

registering the receipt of a first non-corrupted one of said at least two complete specimens at a selected memory location;

discarding any other corrupted or non-corrupted said complete specimens of the same said information packet that have also been received at said output; and clearing said selected memory location after a predetermined time interval starting at the receipt of a first one of said at least two complete specimens, thereby making said selected memory location again available.

7. Method according to claim 6, wherein said complete specimens are transferred over said network in such a way that they follow paths which are at least partly separate.

* * * * *